(12) United States Patent
Carson et al.

(10) Patent No.: US 6,487,155 B1
(45) Date of Patent: Nov. 26, 2002

(54) OPTICAL DISC AUTHENTICATION USING ALTERNATE DATA MODULATION ENCODING SCHEMES

(75) Inventors: Douglas M. Carson, Cushing, OK (US); Henry B. Kelly, Stillwater, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 90 days.

(21) Appl. No.: 09/832,717

(22) Filed: Apr. 11, 2001

Related U.S. Application Data
(60) Provisional application No. 60/196,449, filed on Apr. 11, 2000.

(51) Int. Cl.[7] .................................................. G11B 7/00
(52) U.S. Cl. ............................... 369/59.13; 369/59.27; 369/47.19
(58) Field of Search .......................... 369/47.1, 47.15, 369/47.16, 47.19, 47.21, 47.23, 53.1, 59.1, 59.12, 59.13, 59.19, 59.23, 59.27, 47.2

(56) References Cited

U.S. PATENT DOCUMENTS

| | | | |
|---|---|---|---|
| 5,070,492 A | 12/1991 | Ogawa et al. | |
| 5,075,804 A | 12/1991 | Deyring | |
| 5,343,455 A | 8/1994 | Takeuchi et al. | |
| 5,513,160 A | 4/1996 | Satoh et al. | |
| 5,559,777 A | 9/1996 | Maeda et al. | |
| 5,566,158 A | 10/1996 | Kobayashi et al. | |
| 5,633,841 A | * 5/1997 | Yokota et al. ............ | 369/53.22 |
| 5,687,158 A | 11/1997 | Kawasaki et al. | |
| 5,708,640 A | 1/1998 | Fukuda et al. | |
| 5,712,837 A | 1/1998 | Horigome et al. | |
| 5,768,235 A | 6/1998 | Huber | |
| 6,058,087 A | 5/2000 | Tomita | |
| 6,134,382 A | * 10/2000 | Mishima et al. ............ | 386/111 |
| 6,215,750 B1 | * 4/2001 | Sako et al. .............. | 369/47.24 |

* cited by examiner

Primary Examiner—Muhammad Edun
(74) Attorney, Agent, or Firm—Fellers, Snider, et al.

(57) ABSTRACT

Apparatus and method for writing data to an optical disc, and for subsequently reading the data therefrom. A first modulation encoding scheme (MES1) is defined to encode input data as data symbols having nominal symbol lengths over a first range. A second modulation encoding scheme (MES2) different from the MES1 is further defined to encode input data as data symbols having nominal symbol lengths over a second range. Each symbol length of the second range appears in the first range. The MES1 is used to encode primary data written to the disc while the MES2 is used to encode secondary data inserted at selected locations for disc authentication purposes. A readback system includes a primary decoder which decodes and outputs the primary data, and a secondary decoder which searches for a leading synchronization pattern which, when detected, allows remaining portions of the secondary data to be decoded.

18 Claims, 3 Drawing Sheets

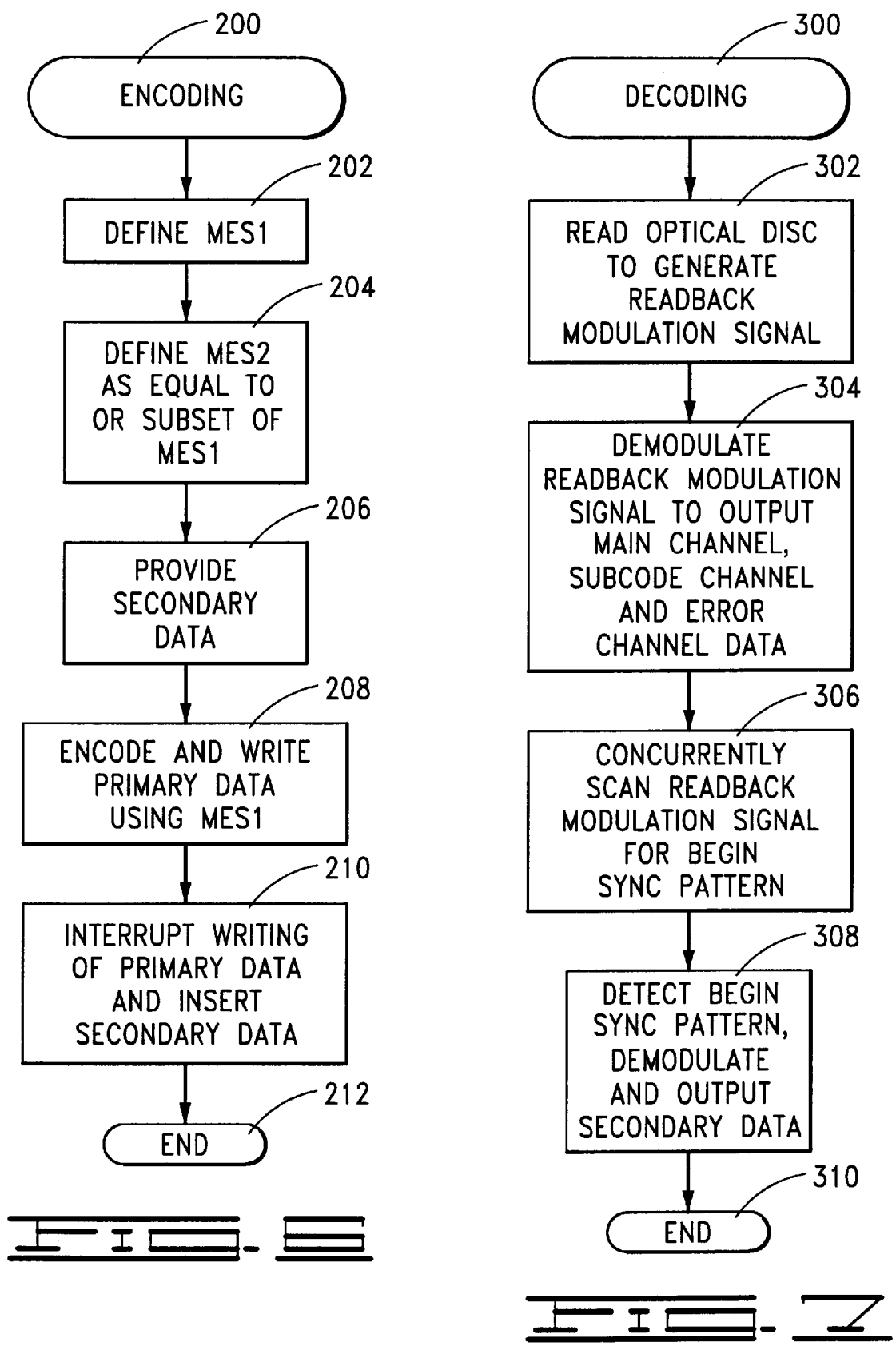

OPTICAL DISC AUTHENTICATION USING ALTERNATE DATA MODULATION ENCODING SCHEMES

RELATED APPLICATIONS

This application claims priority to Provisional Application No. 60/196,449 filed Apr. 11, 2000.

FIELD THE INVENTION

This invention relates generally to the field of optical disc technology and more particularly, but not by way of limitation, to the placement and retrieval of data on an optical disc using alternate data modulation schemes to facilitate disc authentication efforts, including copy protection and forensic tracking.

BACKGROUND

Optical discs have become increasingly popular as efficient and cost-effective storage media for digitally stored data. A typical optical disc comprises a circular disc having a recording layer of light reflective material embedded in a refractive substrate. The recording layer is disposed along a plane substantially normal to an axis about which the disc is rotated and stores data in the form of localized pits and lands (also sometimes referred to as "marks" and "spaces") along a continuously extending spiral track.

The data are recovered from the disc through the use of a light source (such as a laser) which applies light of selected wavelength to the rotating disc, and a transducer which generates a readback signal indicative of the data in relation to the relative differences in reflectivity of the pits and lands. It is common to separate the relative elevations of the pits and lands by a distance equal to a quarter-wavelength of the applied light so as to facilitate a substantial change in the amount of light reflected by the pits as compared to the amount of light reflected by the lands.

One popular optical disc format is commonly referred to as compact disc, or CD, which has found widespread use in recent years in computer applications (such as CD-ROM) and in the music recording industry (audio CDs). A CD has an outer diameter of 120 millimeters (4.724 inches) and a data storage capacity of about 650 megabytes (MB). Another popular optical disc format is commonly referred to as digital versatile disc, or DVD. A DVD has the same form factor as a CD, but has a data storage capacity of about 4.7 gigabytes (GB) per layer. This increased storage capacity generally accommodates a feature-length video movie (DVD-video), or large amounts of other types of data (DVD-ROM, DVD-RAM, DVD-audio, etc.). Other optical disc configurations with different form factors and storage capacities have also been proposed and commercialized.

As will be recognized, the writing of data to an optical disc includes the encoding of each input group of data bits into a corresponding group of modulated bits. Such modulation is necessary to meet run-length requirements that specify how close and how far apart successive logical ones (pit/land transitions) can occur on the disc. If successive transitions are too close together, the detection circuitry may not be able to distinguish the individual transitions; if successive transitions are too far apart, the detection circuitry may lose frequency lock and thus be unable to recover the data from the disc.

Both CDs and DVDs utilize run-length requirements of at least two zeros and no more than ten zeros between successive ones. This results in pits and lands with symbol lengths that range from 3T to 11T, with T of determined period length.

CDs typically use what is referred to as 8/14 modulation ("EFM") so that each 8 bits of input data are modulated into 14 bits of modulated data. For example, an 8-bit data pattern 00001010 (representing the number 10) can provide a corresponding 14-bit modulation pattern of 10010001000000. Since 8/14 modulation patterns (words) can start and/or end with a logical one, CDs additionally use three merge bits between successive modulation words to ensure the run-length rules are not violated at transitions between words. Hence, CD modulation is also sometimes referred to as 8/17 modulation.

DVDs typically use what is referred to as 8/16 modulation ("EFM+") so that each 8 bits of input data are modulated into a corresponding 16-bit modulation pattern. For example, the 8-bit pattern 00001010 (representing the number 10) can result in a corresponding 16-bit modulation pattern of 0010010001000000. Unlike CDs, no merge bits are required between adjacent DVD modulation words.

Due to the worldwide consumer demand for the types of information available on optical discs (e.g., software, music, video, etc.), combined with the relative ease with which unauthorized copies of optical discs can be generated, suppliers of optical discs have attempted to incorporate schemes to authenticate the discs; that is, to determine whether a particular disc is an authorized copy. Such disc authentication can occur in the form of copy protection or forensic tracking efforts.

Generally, copy protection involves configuring the optical disc in such a manner that an authorized disc functions properly in a readback system, but an unauthorized copy does not. One common copy protection scheme used in CD-ROM discs is to write certain copy protection data at certain locations on the disc. When the CD-ROM is subsequently loaded into a host computer, a system processor polls these locations and verifies the contents before granting access to remaining portions of the disc.

Forensic tracking efforts generally entail storing certain "marking" or "tracking" information on the disc. The forensic information usually does not prevent an unauthorized copy from functioning in the readback system, but based on the presence or absence of the information, a determination can be made whether a particular optical disc is in fact an authorized copy. Forensic information may include, for example, information relating to the ownership of the contents of the disc, when and where the mastering process occurred, etc.

Various ways to embed data in an optical disc for use in disc authentication efforts have been proposed in the prior art. A particular approach involves the creation of certain disruptions in the optical disc by violating the run length requirements of the modulation scheme used to record data to the optical disc. For example, in the case of the 8/14 CD and 8/16 DVD modulation schemes which only allow lengths of 3T–11T, embedded data can be incorporated having symbols that are less than 3T or greater than 11T in length.

There are several problems with this approach, however. The run-length requirements of a given modulation scheme are there to ensure the readback system can properly detect and decode the data. Hence, the optical tracking system may have trouble detecting symbol lengths that are too short and the recovery tracking oscillators may lose frequency lock if the symbols are too long. If the run-length violations are sufficiently severe, the violations can induce uncorrectable errors in the application data, compromising the integrity of the optical disc itself.

More importantly, such run-length violations are easily detectable using standard time interval analysis (TIA) test equipment, allowing unscrupulous parties to readily duplicate and defeat the copy protection or forensic information scheme altogether.

Because of these and other considerations, there remains a continued need in the art for improved ways to embed data on an optical disc for disc authentication purposes without interfering with the operability of the disc. It is to such improvements that the present invention is directed.

SUMMARY OF THE INVENTION

The present invention is directed to an apparatus and method for writing data to an optical disc, and for subsequently reading the data therefrom.

In accordance with preferred embodiments, a first modulation encoding scheme (MES1) is defined for the encoding of input data as data symbols having nominal symbol lengths over a first range of symbol lengths. The MES1 is generally related to the particular type of disc; for example, a CD will typically use 8/14 and a DVD will use 8/16.

A second modulation encoding scheme (MES2) different from the first modulation encoding scheme is also defined for the encoding of input data as data symbols having nominal symbol lengths over a second range of symbol lengths. The MES2 is selected to have the same (or to have more stringent) run-length rules than the MES1, so that each symbol length of the second range of symbol lengths from the MES2 appears in the first range of symbol lengths MES1. Moreover, the MES2 is configured to output different symbols for a given input word than the MES1.

The MES1 is used to encode and write primary data to the optical disc, with the primary data having an informational content used by a user of the optical disc. At selected times during the writing of the primary data, the MES2 is used to encode and write secondary data to the optical disc at a location adjacent a portion of the primary data. The secondary data have an informational content used to authenticate the optical disc as an authorized copy and include a leading synchronization pattern which, when detected, allows remaining portions of the secondary data to be decoded using the MES2.

Preferably, the data are subsequently read from the optical disc using a specially configured readback system having a primary decoder configured in accordance with the MES1 to decode the primary data, and a secondary decoder connected in parallel with the primary decoder configured in accordance with the MES2 to decode the secondary data. A readback modulation signal is transduced from the optical disc and concurrently transmitted to both the primary and secondary decoders. The primary decoder operates upon the readback modulation signal to output the primary data, while the secondary decoder searches the readback modulation signal for the leading synchronization pattern and, upon detection, outputs the secondary data. Preferably, the secondary decoder is further configured to detect and correct errors in the secondary data.

In this way, disc authentication data can be readily placed on the optical disc without interfering with the readback capabilities of the disc. Because the encoding of the secondary data does not violate the standard run-length rules for the disc (i.e., the MES1), no run-length violations will be detected.

These and various other features and advantages which characterize the present invention will be apparent from a reading of the following detailed description and a review of the associated drawings.

BRIEF DESCRIPTION OF THE DRAWINGS

FIG. 6 is a flow chart for an ENCODING routine, setting forth steps in accordance with preferred embodiments to write the primary and secondary data to the disc.

FIG. 7 is a flow chart for a DECODING routine, setting forth steps in accordance with preferred embodiments to recover the primary and secondary data from the disc.

DETAILED DESCRIPTION

Various embodiments of the present invention will now be described with reference first to FIG. 1, which shows a simple data modulation encoding system to illustrate the general operation of the present invention.

Figure 1:
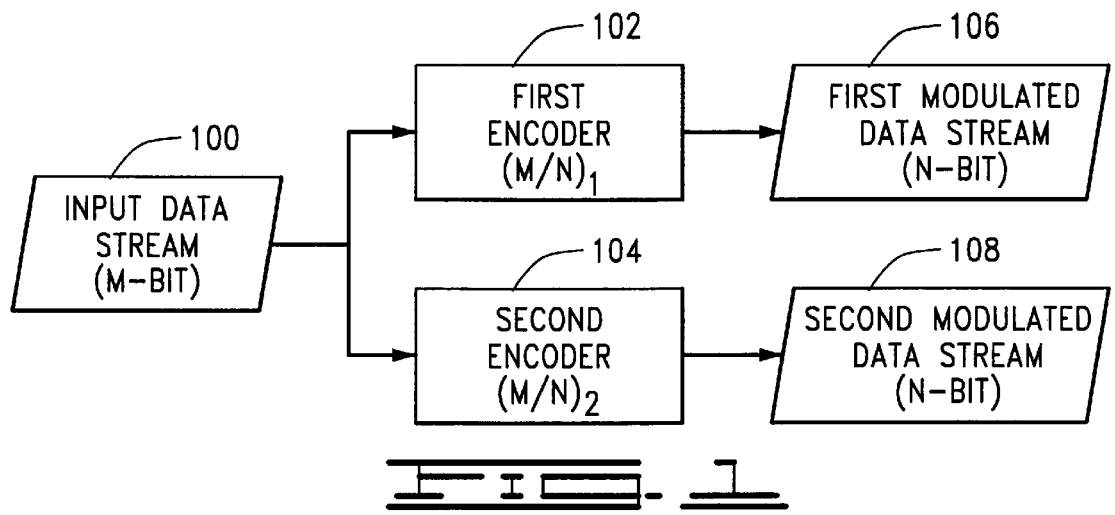
FIG. 1 is a functional block diagram of a simple data modulation encoding system to illustrate the general operation of the present invention.

As shown in FIG. 1, input data organized as a series of m-bit patterns, or words, are supplied in parallel from an input data stream 100 in to first and second encoders 102, 104. The first and second encoders 102, 104 each employ separate m/n modulation encoding schemes to convert each m-bit input word into a corresponding n-bit output word to produce separate first and second modulated data sets 106, 108. For example, using differently defined 8/16 modulation encoding schemes, the same 8-bit input word might result in a 3T, 3T, 4T, 5T symbol train in the first data set 106 and a 5T, 3T, 7T symbol train in the second data set 108.

The range of possible symbol lengths for both schemes are either the same (e.g., 3T to 11T), or one is a subset of the other (e.g., 3T to 11T for the first modulation encoding scheme, and 3T to 9T for the second modulation encoding scheme). Either way, it will not be readily discernable from the first and second data sets whether any particular portion of the data was modulated using the first modulation encoding scheme or the second modulation encoding scheme.

Figure 2:
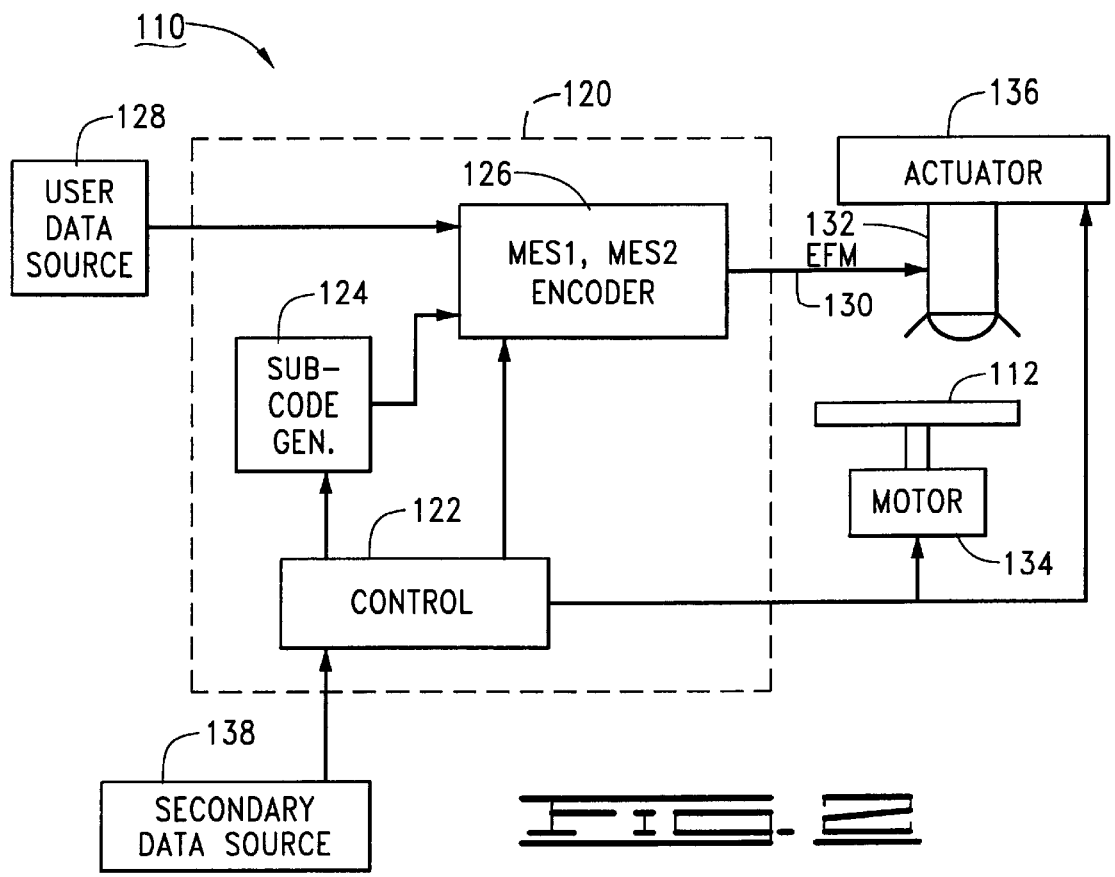
FIG. 2 shows a block diagram for an optical disc writing system constructed in accordance with preferred embodiments of the present invention to write data to an optical disc.

FIG. 2 shows a block diagram for an optical disc writing system 110 constructed in accordance with preferred embodiments of the present invention to write data to an optical disc 112. The system 110 can comprise an optical disc mastering system which produces a glass master from which replicated discs are subsequently formed in a high volume replication environment. Alternatively, the system 110 can comprise an optical disc writer which writes data to a write-once or rewriteable (write-many) optical disc. For purposes of providing a concrete example, the optical disc 112 will be contemplated as comprising a CD, but such is not limiting to the claimed invention.

The system 110 includes a signal processing unit 120 ("modulator") having a control circuit 122, a subcode generator 124 and an MES1, MES2 encoder circuit 126. The encoder circuit 126 is configured to normally modulate input data in accordance with a first modulation encoding scheme (MES1), such as conventional 8/14 CD modulation. The encoder circuit 126 is further configured to alternatively modulate certain input data in accordance with a second modulation encoding scheme (MES2) different from MES1.

At this point it will be noted that each symbol length in MES2 is available in MES1, but not vice versa. With the exception of the novel capabilities discussed herein, the signal processing unit 120 is otherwise generally constructed as known in the art and so details not germane to the present invention have been omitted for clarity. Preferably, the signal processing unit 120 is resident in a personal computer (PC) and realized in a combination of hardware and software.

During normal operation, user data from source 128 and subcode from subcode generator 124 are provided to the encoder circuit 126 for modulation in accordance with MES1. The resulting modulated EFM signal is provided on path 130 to a transducer 132 (such as a laser) which writes the modulated data to the optical disc 112. The control circuit 122 controls a disc spin motor 134 and an actuator 136 to write the data to the desired location on the disc 112. The user data and subcode are collectively referred to herein as "primary data."

Secondary data (also referred to as "hidden" or "forensic" data) are provided from a secondary data source 138 to the control circuit 122. At predetermined desired times, the control circuit 122 passes the secondary data 138 to the modulator 126 along with a command to encode the secondary data using the MES2; hence, the encoded secondary data are inserted into the primary data stream and written to the optical disc 112. The locations of the secondary data are preferably selected so as to not interfere with the playback of the primary data.

Figure 3:
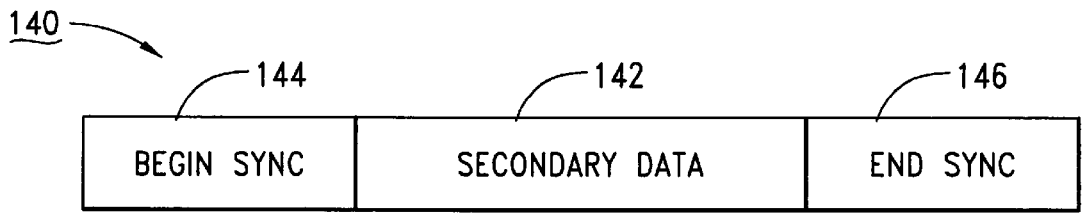
FIG. 3 provides a first preferred format for secondary data provided on the optical disc by the system of FIG. 2.

FIG. 3 shows a preferred format 140 of the encoded secondary data written by the system 110 of FIG. 2. The informational content of the secondary data is provided in a secondary data field 142, flanked by a leading synchronization field 144 ("begin sync") and a trailing synchronization field 146 ("end sync"). The begin sync field 144 and the end sync field 146 store synchronization patterns that are preferably selected to have a maximum Hamming distance from normal symbol patterns used during the encoding of data using the MES1. In this way, a specially constructed readback system (as discussed below) can operate to search for and detect the synchronization patterns to enable correct readback of the secondary data. It will be noted that the control circuit 122 of FIG. 2 is preferably configured to provide the necessary patterns to the modulator circuit 126 to generate the format 140 of FIG. 3, including generation of the begin and end sync patterns.

Figure 4:
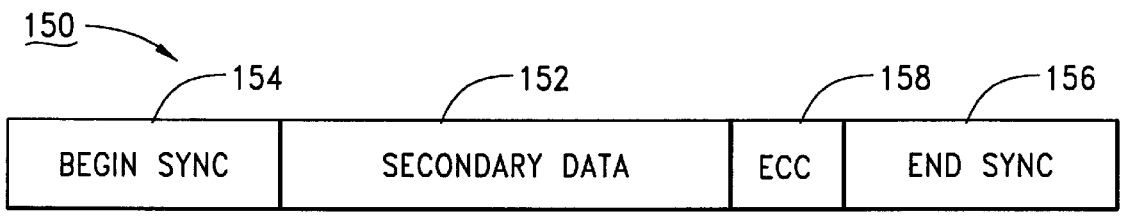
FIG. 4 provides another preferred format for the secondary data on the disc.

FIG. 4 provides an alternative format 150 for the encoded secondary data. Like the format 140 of FIG. 3, the format 150 of FIG. 4 includes a secondary data field 152, and begin and end sync fields 154, 156. In addition, error correction codes for the secondary data are calculated by the control circuit 122 and appended in an ECC field 158 for the detection and correction of errors in the secondary data. This provides a certain level of fault-tolerance for the secondary data, which may be desirable in certain circumstances. The error correction codes may be parity bits, checksum bits, Reed Solomon codes, etc. selected in accordance with the requirements of a given application.

Figure 5:
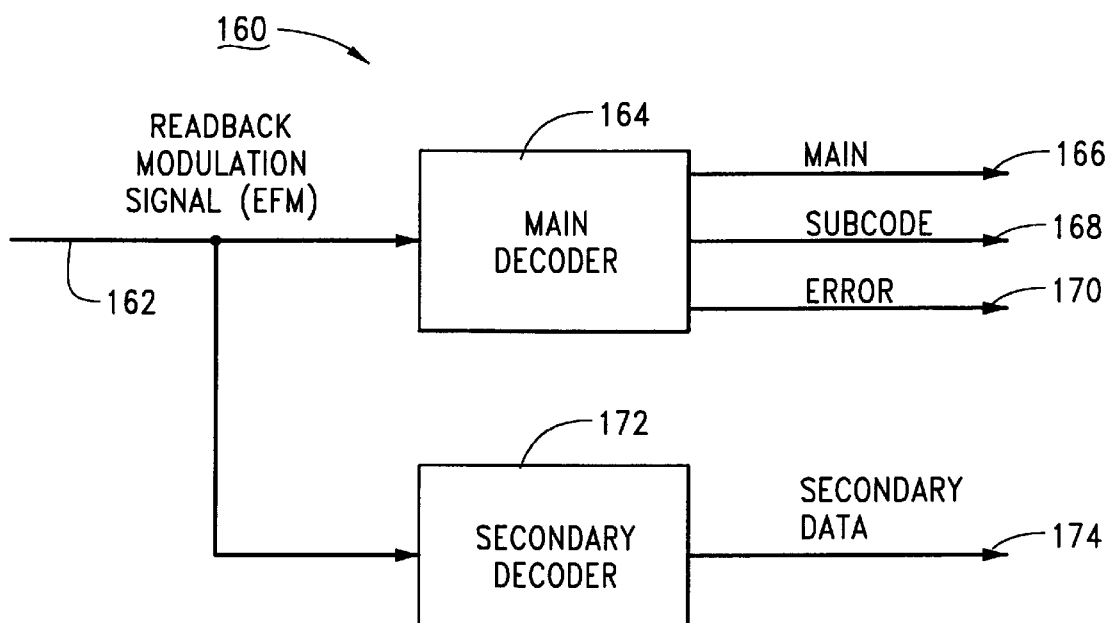
FIG. 5 provides a functional block diagram for an optical disc readback system configured to readback the primary and secondary data written to the optical disc by the system of FIG. 2.

FIG. 5 provides a block diagram for relevant portions of a readback system 160 constructed in accordance with preferred embodiments to readback data previously written to the optical disc 112 by the system 110 of FIG. 2. A readback modulation signal (such as an EFM signal in the case of a CD) is obtained by reading the optical disc 112 and discerning the pit and land symbol lengths formed during the writing of the data to the disc. The readback modulation signal is provided on a signal path 162 to a conventional main decoder 164, also referred to herein as the "primary decoder."

The primary decoder 164 operates to demodulate the signal and sort the resulting, decoded data into main channel data on path 166, subcode channel data on path 168, and error channel data on path 170. As will be recognized, the main channel data correspond to the user data initially supplied by the user data source 128 of FIG. 2, and are provided to the appropriate output device (such as computer bus in the case of a CD-ROM, an audio playback circuit in the case of a CD-audio disc, etc.). The subcode data are used to indicate tracking and timing information relating to the main channel data. The error channel data indicate the operation of the error correction system in correcting errors on the fly in the main and subcode channel data.

The readback modulation signal on path 162 is further provided to a secondary decoder 172 which operates in parallel with the primary decoder 164. The secondary decoder 172 scans the readback modulation signal for the begin sync pattern of the secondary data (e.g., field 144, FIG. 3; field 154, FIG. 4). Once the begin sync pattern is detected, the secondary decoder 172 proceeds with the demodulation of the secondary data (e.g., field 142, FIG. 3; field 152, FIG. 4) until detection of the end sync pattern (e.g., field 146, FIG. 3; field 156, FIG. 4). The decoder 172 is advantageously configured to apply on-the-fly error correction to the secondary data, as well as to abort the decoding operation if symbol lengths within the secondary data are found to violate the MES2 or if the end sync pattern is not detected within a specified timeframe.

In this way, the decoder 172 can be thought of as generally operating along the similar lines as a barcode reader. As will be recognized, barcodes are required to be in bars or strips due to the nature of the scanners used to read the codes, but in fact each individual horizontal line in a barcode contains all the information of the barcode. Each horizontal line is simply repeated numerous times to create the vertical bars, and has dark and light spaces that generally correspond to a sequence of pits and lands on an optical disc. Barcodes often incorporate leading and trailing sync patterns and barcode scanners typically operate in a continuous scanning mode, looking for the leading sync pattern. Once detected, the scanner decodes the information from the code. Thus, a "barcode" type detection algorithm could readily be used by the decoder 172, provided the MES2 rules are defined to be equal to, or a subset of, the MES1 rules. It will be noted that the operation of the first and second decoders can be readily carried out by the same circuitry configured to perform these dual functions.

FIGS. 6 and 7 summarize the operation of the present invention to encode and decode data, respectively. FIG. 6 shows an ENCODING routine 200, generally illustrative of steps carried out by a writing system (such as the system 110 of FIG. 2) to write data to an optical disc in accordance with preferred embodiments of the present invention.

As shown in FIG. 6, the first step is to define the MES1, step 202. This will be a function of the optical disc format; for example, a CD will typically use conventional 8/14 CD modulation as the MES1; a DVD will typically use convention 8/16 DVD modulation as the MES1. The user therefore has little or no discretion during step 202.

However, at step 204, the user has quite a bit of discretion in selecting MES2, so long as MES2 is equal to or is a subset of the MES1 scheme; that is, every symbol length available in MES2 appears in MES1. The actual MES2 scheme chosen during step 204 will depend upon the circumstances. Commercially available detection circuits (such as certain types of barcode detector circuits) may support a symbol length range that is a subset of a conventional optical disc modulation encoding scheme; this could be a commercially viable alternative to designing a separate algorithm or circuit from scratch. Appropriate begin and end sync patterns are also preferably selected at this time using computer search algorithms or other suitable methodologies.

Once the MES2 scheme is identified, the secondary data are identified at step 206. The actual data used as secondary data will depend upon the circumstances. In a copy protection mode, the secondary data may be selected to be any data that authenticates, or uniquely identifies, the disc. This allows a processor to poll the disc to search for the secondary data. Once the secondary data are successfully decoded, the disc is unlocked and access granted. Of course, most such copy protection schemes require a separate computer bus and processor that can launch an application before disc access, items readily available in a computer ROM or RAM environment, but not typically in a simple audio or video playback environment.

In a forensic tracking mode, the secondary data may be any information useful during subsequent analysis of a given disc that may be able to determine whether in fact the disc is an authorized copy. Such data might be selected to specifically identify the source or date of the disc mastering (or formatting), a batch or lot number linked to specific equipment used to write the data, a license number showing authorization to write the contents, a "signature" of the author, etc. Care should be taken to not make the secondary data unnecessarily long, since the secondary data are preferably placed on the disc in an inconspicuous location to reduce detection and interference with primary data playback. It will be noted that the same secondary data content can be provided at multiple locations in a disc, and that different secondary data fields having different data contents can also be placed on the disc. Conversely, redundant sets of the same hidden data can be provided at multiple locations to improve fault-tolerance. Of course, it will be noted that only a specially configured readback system such as shown in FIG. 5 will generally be able to successfully decode the secondary data once the data are written to the disc.

Once the secondary data are identified, the routine of FIG. 6 continues to step 208 wherein primary data (user data and subcode) are encoded and written to the optical disc using the MES1 scheme. This writing is interrupted periodically, as shown at step 210, to allow the insertion of the secondary data into the primary data stream (including the begin and end sync patterns) at desired locations on the disc. Steps 208 and 210 are thus repeated until all the data are written to the disc, after which the routine ends at step 212.

FIG. 7 provides a DECODING routine 300, generally illustrative of steps carried out by a readback system (such as the system 160 of FIG. 5) to readback data previously written to an optical disc in accordance with preferred embodiments of the present invention. At step 302, the optical disc 112 is read to generate a readback modulation signal.

This readback modulation signal is demodulated at step 304 by a main decoder 164 to output main channel, subcode channel and error channel data streams, as shown in FIG. 5.

Concurrently, the readback modulation signal is further scanned by a secondary decoder 172 for a begin sync pattern, step 306. Once the begin sync pattern is detected, the secondary data are demodulated and output for the intended use, after which the flow ends at step 310.

The present invention provides several important advantages over the prior art. The use of the novel scheme disclosed herein should allow the optical tracking (pickup) system and the recovery oscillators to function normally to maintain tracking and data frequency lock. No run-length violations will be detectable during disc testing, so time interval analysis (TIA) equipment should not flag the presence of the hidden data. There will be no, or at least minimal, increase in error rates during testing. Further, the encoding scheme will not interfere with the recovery of the primary data.

In sum, the present invention is directed to an apparatus and method for writing data to an optical disc. In accordance with preferred embodiments, the data are written to an optical disc 112 in accordance with a method in which a first modulation encoding scheme (MEM1) is defined for the encoding of input data as data symbols having nominal symbol lengths over a first range of symbol lengths (step 202, FIG. 6). A second modulation encoding scheme different from the first modulation encoding scheme is also defined for the encoding of input data as data symbols having nominal symbol lengths over a second range of symbol lengths (step 204, FIG. 6). The MES1 and MES2 are selected so that each symbol length of the second range of symbol lengths appears in the first range of symbol lengths, and for a given input data word, different series of output symbols are respectively generated by the MES1 and MES2.

Thereafter, the MES1 is used to encode and write primary data to the optical disc, with the primary data having an informational content used by a user of the optical disc (step 208, FIG. 6). At selected times, the MES2 is used to encode and write secondary data to the optical disc at a location adjacent a portion of the primary data, the secondary data having an informational content used to authenticate the optical disc as an authorized copy (step 210, FIG. 6). The secondary data include a leading synchronization pattern (fields 144, 154, FIGS. 3–4) which, when detected, allows remaining portions of the secondary data to be decoded using the MES2.

Preferably, the data are subsequently read from the optical disc using a readback system 160 having a primary decoder (164, FIG. 5) configured in accordance with the MES1 to decode the primary data, and a secondary decoder (172, FIG. 5) connected in parallel with the primary decoder to decode the secondary data. A readback modulation signal (path 162, FIG. 5) is transduced from the optical disc and concurrently transmitted to both the primary and secondary decoders (step 302, FIG. 7). The primary decoder operates upon the readback modulation signal to output the primary data (step 304, FIG. 7), while the secondary decoder searches the readback modulation signal for the leading synchronization pattern and, upon detection, outputs the secondary data (steps 306, 308, FIG. 7). Preferably, the secondary decoder is configured to detect and correct errors in the secondary data.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for writing data to an optical disc in which input data are encoded to provide a corresponding series of data symbols having nominal symbol lengths, the method comprising steps of:

(a) defining a first modulation encoding scheme for the encoding of input data as data symbols having nominal symbol lengths over a first range of symbol lengths;

(b) defining a second modulation encoding scheme different from the first modulation encoding scheme for the encoding of input data as data symbols having nominal symbol lengths over a second range of symbol lengths so that, for a given set of input data, the second modulation encoding scheme provides a different set of data symbols as compared to the first modulation encoding scheme, wherein each symbol length of the second range of symbol lengths appears in the first range of symbol lengths;

(c) using the first modulation encoding scheme to encode and write primary data to the optical disc, the primary data having an informational content used by a user of the optical disc; and (d) using the second modulation encoding scheme to encode and write secondary data to the optical disc at a location adjacent a portion of the primary data, the secondary data having an informational content used to authenticate the optical disc as an authorized copy, wherein the secondary data include a leading synchronization pattern which, when detected, allows remaining portions of the secondary data to be decoded using the second modulation encoding scheme.

2. The method of claim 1, wherein the first range of symbol lengths is the same as the second range of symbol lengths.

3. The method of claim 1, wherein the first range of symbol lengths is greater than the second range of symbol lengths.

4. The method of claim 1, wherein the first modulation encoding scheme provides a first range of symbol lengths of from 3T to 11T, wherein T is a time period of selected length.

5. The method of claim 1, wherein the secondary data comprise copy protection data so that the informational content of the secondary data is verified before access is granted to remaining portions of the optical disc.

6. The method of claim 1, wherein the secondary data comprise forensic tracking data so that the informational content of the secondary data provides information with regard to the primary data.

7. The method of claim 1, wherein the secondary data further include a trailing synchronization pattern which, when detected, indicates an end of the secondary data.

8. The method of claim 1, further in combination with a method for subsequently reading the optical disc, comprising steps of:

(e) providing a readback system having a primary decoder configured in accordance with the first modulation encoding scheme to decode the primary data, and a secondary decoder connected in parallel with the primary decoder to decode the secondary data;

(f) reading the optical disc to generate a readback modulation signal;

(g) concurrently transmitting the readback modulation signal to the primary and secondary decoders, wherein the primary decoder operates upon the readback modulation signal to output the primary data, and wherein the secondary decoder searches the readback modulation signal for the leading synchronization pattern and, upon detection, outputs the secondary data.

9. The method of claim 8, wherein the secondary decoder is further configured to detect and correct errors in the secondary data.

10. An optical disc having primary and secondary data written thereto in accordance with the method of claim 1.

11. An optical disc readback system configured to read data from an optical disc, comprising:

a primary decoder configured to decode primary data previously encoded in accordance with a first modulation encoding scheme in which the primary data are modulated as a series of data symbols on the disc having nominal symbol lengths over a first range of symbol lengths, the primary data having an informational content used by a user of the optical disc readback system;

a secondary decoder configured to decode secondary data previously encoded in accordance with a second modulation encoding scheme different from the first modulation encoding scheme in which the secondary data are modulated as a series of data symbols on the disc having nominal symbol lengths over a second range of symbol lengths so that, for a given set of input data, the second modulation encoding scheme provides a different set of data symbols as compared to the first modulation encoding scheme, wherein each symbol length of the second range of symbol lengths appears in the first range of symbol lengths, and wherein the secondary data include a leading synchronization pattern which, when detected, allows remaining portions of the secondary data to be decoded using the second modulation encoding scheme, the secondary data having an informational content used to authenticate the optical disc as an authorized copy; and a transducing head which transduces a readback modulation signal from the disc, wherein the readback modulation signal is concurrently provided to the primary and secondary decoders, wherein the primary decoder operates upon the readback modulation signal to output the primary data, and wherein the secondary decoder searches the readback modulation signal for the leading synchronization pattern and, upon detection, outputs the secondary data.

12. The optical disc readback system of claim 11, wherein the primary data comprise main channel data and subcode data, and wherein the primary decoder separately outputs the main channel data and subcode data.

13. The optical disc readback system of claim 11, wherein the first range of symbol lengths is the same as the second range of symbol lengths.

14. The optical disc readback system of claim 11, wherein the first range of symbol lengths is greater than the second range of symbol lengths.

15. The optical disc readback system of claim 11, wherein the secondary data further include a trailing synchronization pattern which, when detected, indicates an end of the secondary data.

16. The optical disc readback system of claim 11, wherein the secondary decoder operates to detect and correct errors in the secondary data.

17. The optical disc readback system of claim 11, wherein the secondary data comprise copy protection data so that the informational content of the secondary data is verified before access is granted to remaining portions of the optical disc.

18. The optical disc readback system of claim 11, wherein the secondary data comprise forensic tracking data so that the informational content of the secondary data provides information with regard to the primary data.

* * * * *